United States Patent [19]

Piatt et al.

[11] Patent Number: 4,853,713

[45] Date of Patent: Aug. 1, 1989

[54] COMPACT PRINTER HAVING IMPROVED SHEET CASSETTE

[75] Inventors: Michael J. Piatt, Enon; Kevin L. Houser, Kettering, both of Ohio

[73] Assignee: Eastman Kodak Company, Rochester, N.Y.

[21] Appl. No.: 192,569

[22] Filed: May 11, 1988

[51] Int. Cl.[4] .................... G01D 15/28; G03B 27/58; B65H 1/08

[52] U.S. Cl. .............................. 346/134; 346/76 PH; 355/321; 271/127; 271/160; 271/167

[58] Field of Search .................. 346/76 PH, 136, 134; 355/3 SH, 14 SH; 271/127, 160, 167

[56] References Cited

U.S. PATENT DOCUMENTS 4,487,406 12/1984 Kasashima .......................... 271/127

4,569,587 2/1986 Miyoshi et al. ....................... 355/72

4,621,272 11/1986 Toriumi et al. ..................... 346/134

*Primary Examiner*—E. A. Goldberg

*Assistant Examiner*—Gerald E. Preston

*Attorney, Agent, or Firm*—John D. Husser

[57] ABSTRACT

An improved sheet supply cassette for a compact printer of the kind having a housing, a sheet feed assembly for moving a sheet from a sheet supply region to, and through, a print zone and a device for printing on sheet media at the print zone. The sheet supply cassette is coupled to the bottom of the printer and includes top, bottom and side walls forming a sheet supply region. The bottom wall of the cassette has a hinge-type construction wherein cantilever spring means couple and upwardly bias a movable wall segment with respect to a fixed rear segment of the bottom wall so as to urge sheets into a feed position.

7 Claims, 5 Drawing Sheets

Fig. 5a
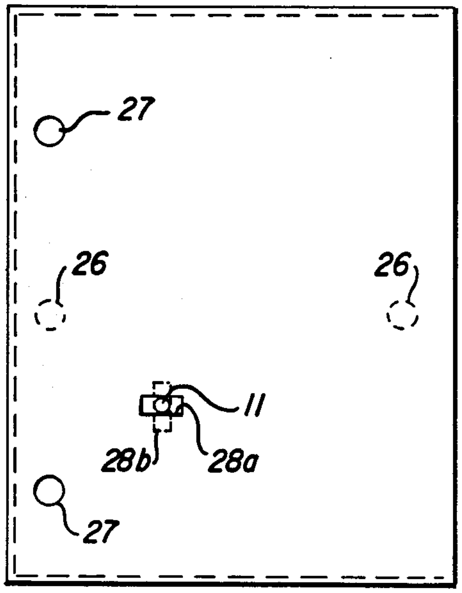
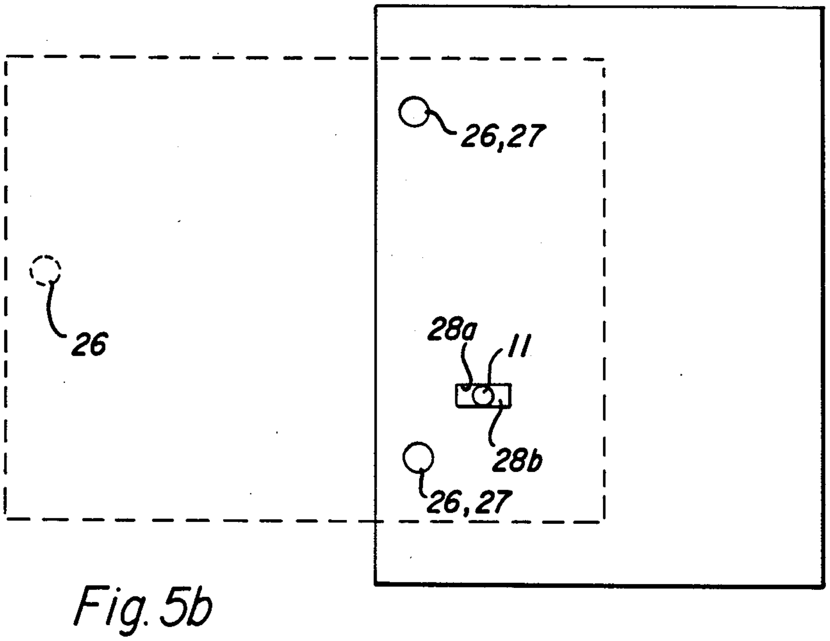
Fig. 5b

COMPACT PRINTER HAVING IMPROVED SHEET CASSETTE

BACKGROUND OF INVENTION

1. Field of Invention

The present invention relates to compact printers having mechanized sheet feed capability and more specifically to improved sheet cassette constructions for such printers.

2. Background Art

Compact printers have become increasingly popular as output devices for personal computers, particularly portable or "lap-top" computers. One desirable accessory feature for such printers is for storing and selectively feeding sheets of print media, to and through the printing operation. However, the addition of space and structure for storing and feeding sheets adds size to the printer and thus works away from another desirable feature, compactness.

Concurrently field U.S. application Ser. No. 192568, entitled "Compact Printer With Adjustable Sheet Storage Cassette", by M. Piatt, describes a new structural approach for achieving the advantage of sheet storage and mechanized sheet feed, with minimal increase to the perimeter size (or "footprint" area) of the printer system. This approach provides a printer and sheet cassette of substantially sheet-size perimeter dimensions. The sheet cassette is rotatably coupled to the bottom of the printer so as to be indexable between a storage condition (with the perimeters of printer and cassette aligned) and an operative printing condition (wherein the stack of sheets in the cassette is operatively aligned with the print zone of the printer). With the cassette in its printing condition, a sheet feed roller can advance sheets from the cassette to the print path so that successive lines can be printed across the width of the paper in conventional page fashion.

This structural approach is very advantageous in reducing the storage-condition footprint area of the printer/feeder system. However, the addition of a sheet cassette to such compact printers, by necessity, increases the system height.

SUMMARY OF THE INVENTION

One object of the present invention is to provide for printer/feeder systems such as described in above-mentioned Application Ser. No. 192568, improved sheet cassette constructions that minimize the printer/feeder system height. A related object of the present invention is to provide for such printer/feeder systems, printer and cassette constructions that cooperate to facilitate the loading of replacement sheets into the sheet cassette.

In one preferred embodiment the present invention constitutes in a compact printer of the kind having a housing, means defining a sheet feed path from a heat supply region to, and through, a print zone and means for printing on sheet media at the print zone, an improved sheet supply cassette comprising: (i) top, bottom and side walls forming a container having a generally sheet-size perimeteral outline and height sufficient to receive a stack of sheet media, the bottom cassette wall having a hinge configuration wherein a cantilever spring joins and upwardly biases a movable front wall segment with respect to a fixed rear segment of the cassette bottom wall; and (ii) means for rotatably coupling the top wall of the sheet supply cassette to the bottom of the printer housing. Printer cassettes according to the present invention can also comprise rotatable cam means, located on the cassette, for moving the front segment of the cassette bottom wall, against the cantilever spring bias, to open the front of the cassette for sheet loading.

BRIEF DESCRIPTION OF DRAWINGS

The subsequent description of preferred embodiments refers to the accompanying drawings wherein:

FIGS. 5*a* and 5*b* are schematic diagrams further illustrating the storage and printing orientations of the sheet cassette of the FIG. 1 printer;

DETAILED DESCRIPTION OF PREFERRED EMBODIMENTS

Figure 1:
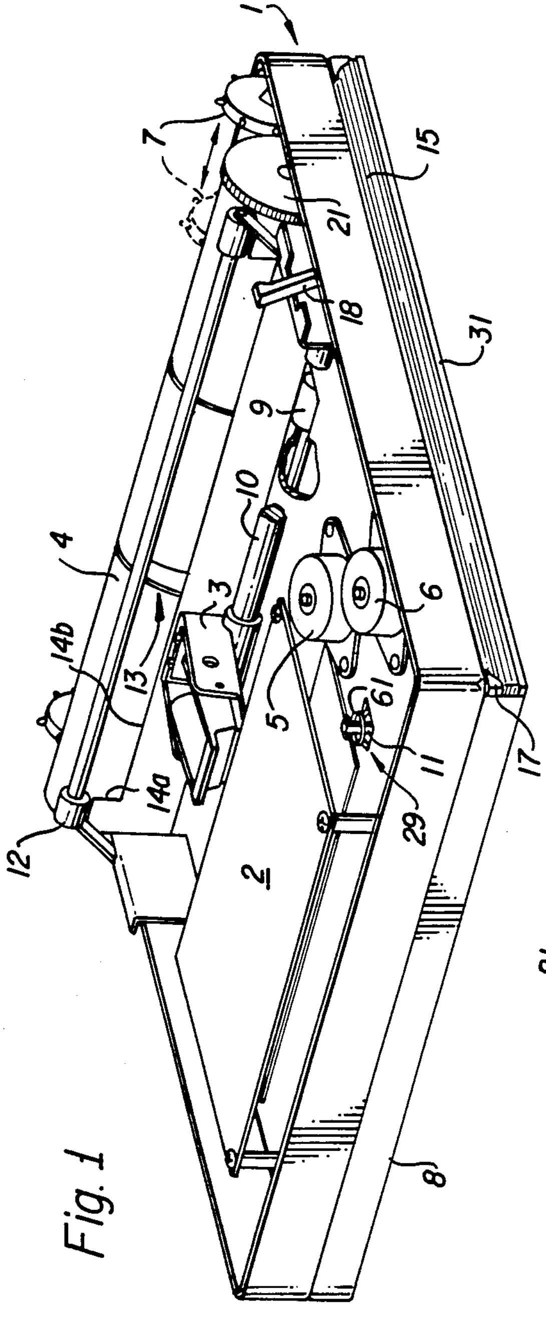
FIG. 1 is a perspecrtive view of one compact printer with which cassettes in accord with the present invention can be cooperatively used.

The printer shown in FIG. 1 has a housing designated generally 1 with top, bottom and side walls that enclose the other printer components and whose inner surfaces can provide main frame support for the assembly of the printer components. Thus, printer platen 4 is mounted for rotation to advance print media from the bottom region of the printer, up through a print zone and out an opening in the top of the printer housing (or through an open top wall lid of the housing, not shown). A print carriage 3 is mounted on guide rail 10 to traverse the print zone 13 and print lines upon media fed therepast by platen 4. Stepper motors 5 and 6 are respectively coupled via drive transmission elements to traverse the print carriage 3 and rotate platen 4, under the control of the electronics on circuit board 2, which is located in the top front of the housing enclosure. The printer can be powered by batteries located within platen 4 as described in more detail in U.S. Pat. No. 4,759,646, filed Apr. 24, 1986. The print carriage 3 is constructed to receive, position and connect an ink jet print cartridge in the manner described in more detail in U.S. Pat. No. 4,736,213, filed Dec. 22, 1986. A sheet supply cassette 8 constructed in accord with the present invention is shown in its carrying/storage position in FIG. 1 and will be described in more detail subsequently.

Figure 3:
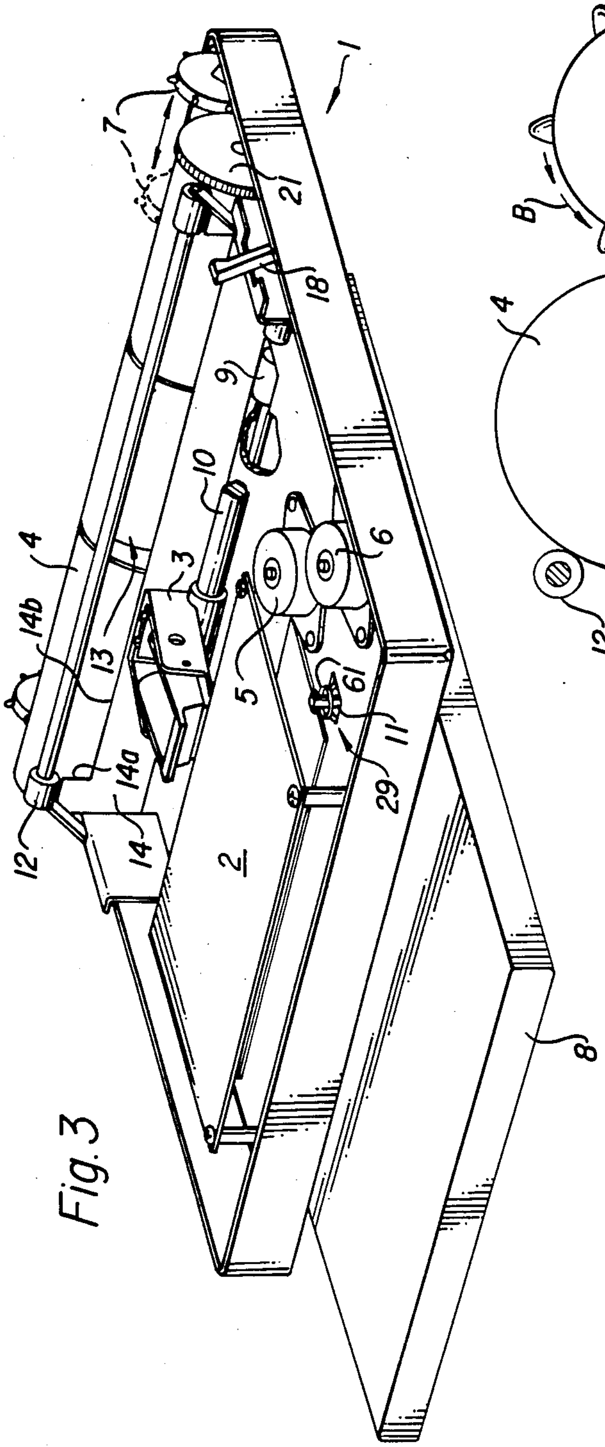
FIG. 3 is a perspective view, like FIG. 1, but with the sheet cassette in a printing orientation rather than its storage orientation.
Figure 2:
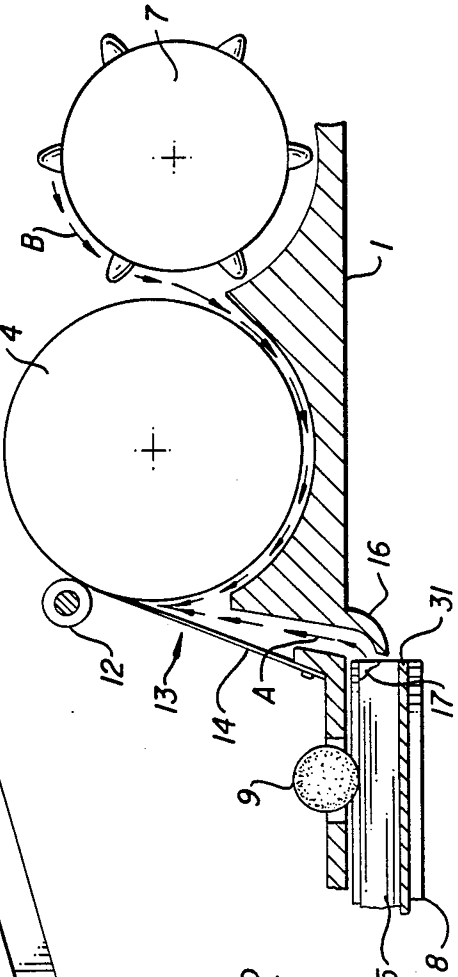
FIG. 2 is a cross-sectional schematic view illustrating the sheet media feed path of the FIG. 1 printer and cassette.

Referring now to FIG. 2, the paper feed path is shown in more detail, with the sheet supply cassette 8 rotated 90° from FIG. 1, to its sheet feed position better shown in FIG. 3. Thus, upon actuation of sheet feed roller 9, a top sheet of paper is fed from stack 15 through buckle separators 17, on cassette side members 90, and into the print path ingress defined by sheet guides 16, formed in the base of the printer. The lead edge of the fed sheet proceeds along the dotted arrow path A (shown in FIG. 2) between the extension of guide 16 and paper guide shim 14. As can be seen in FIGS. 1 and 2, edge portions 14*a* of guide shim 14 extend to the nips formed between platen 4 and bail rollers 12, and the central portion 14*b* of the shim plate is relieved to expose the print zone 13. The sheet supply container has a force plate denoted in general 31, which is coupled to its lower wall to urge the loading portion of a contained sheet stack toward feed roller 9. FIG. 2 also shows how continuous print media can be fed over sprocket wheels 7 and beneath platen 4 from an opening in the rear wall of the printer, along the dotted arrow path B.

It can be seen, by comparing FIGS. 1 and 3, that, in accord with the invention described in concurrently filed U.S. application Ser. No. 142,568, entitled "Compact Printer with Adjustable Sheet Storage Cassette", the cassette 8 is rotatable 90° with respect to the remainder of the printer, between the storage/carrying position shown in FIG. 1 and the sheet feeding position shown in FIG. 3. Such rotatable indexing of the cassette 8 is accomplished by the spring-loaded mounting (denoted generally 29) which couples the cassette 8 to the printer housing, with the cassette top wall urged toward the bottom wall of the printer.

Figure 4:
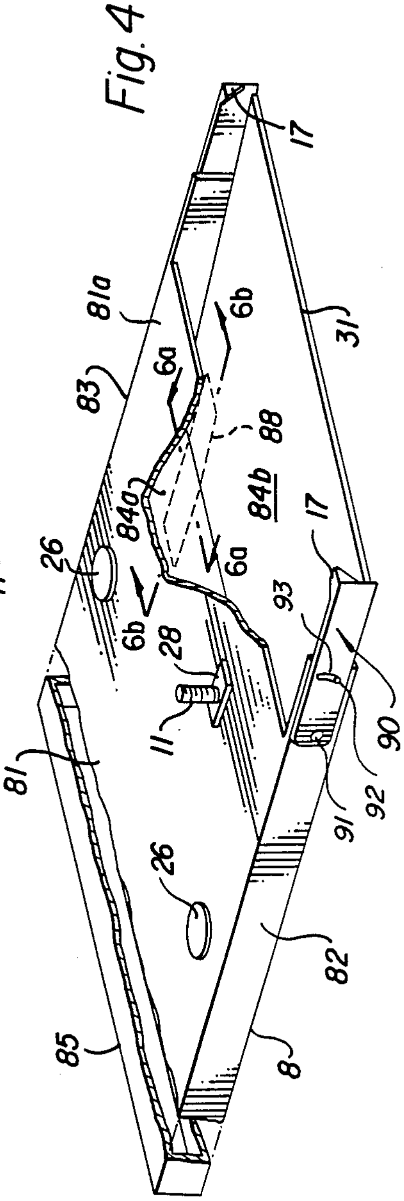
FIG. 4 is a perspective view of one preferred sheet cassette structure in accord with the present invention as detached from the FIG. 1 printer's bottom wall.

The construction of the sheet cassette 8 for rotation and detenting on the bottom of the printer can be seen more clearly in FIGS. 4, 5*a* and 5*b*. Thus, the cassette top wall has an attached, threaded pivot pin 11 that extends upwardly to protrude through the mounting hole in the bottom wall of the printer. Coil spring 61 is located around the portion of pin 11 that extends through the bottom hole and, during assembly, is compressed between a nut on the top of pin 11 and the bottom printer wall so as to urge the top of the container toward the bottom of the printer.

To provide for a shift between the FIG. 1 and FIG. 3 conditions by a simple rotation movement of 90°, the cassette pin 11 and cooperative hole in the bottom of the printer wall are predeterminedly located as shown in FIGS. 5*a* and 5*b*. Also, the perimeters of cassette 8 and printer housing 1 are selected to be substantially the same size as the sheet media utilized in the printer (e.g., approximately $8\frac{1}{2}\times 11$ inches). In the storage position the housing and cassette perimeters are approximately coincident, one above the other (FIG. 1 and FIG. 5*a*) and the pin/hole rotation axis is located so that, in the 90° rotated sheet feed position (shown in FIGS. 3 and 5*b*), the cassette's longitudinal sides are centered with respect to the printer width (and thus the sheet feed path of the printer).

In order to allow easy sliding movement of the cassette during its condition-shift rotation (and to provide clearance for printer base guide 16 and the sheet feed roller which extends through a central portion of the printer bottom wall), bosses 26 are formed on the top wall of the cassette. As shown in FIGS. 5*a* and 5*b*, the printer bottom wall has two indent recesses 27 that are configured to receive two of bosses 26 in detent relation, when the cassette 8 has been rotated into the proper sheet feed position. Also the printer bottom wall has a slot 28*a* configured to receive a key portion 28*b* formed on the bottom of pivot pin 11, so that the cassette, and the exposed forward portion of its sheet stack, can move toward the printer bottom when properly indexed into the sheet feed condition. This allows the top sheet of a stack in the cassette to properly engage the feed roller 9, under upward bias of force plate 31.

From the foregoing general description of the adjustable printer/cassette system of U.S. application Ser. No. 192,568, it can be understood how the system's perimeter dimension (or "footprint" area) is configured to a minimum for storage or carrying modes. One important aspect of the present invention is to reduce, also, the height of such a printer/cassette system to the minimum, for any given sheet storage capacity. One preferred construction by which this objective is accomplished can be seen best in FIG. 4.

Figure 6A:
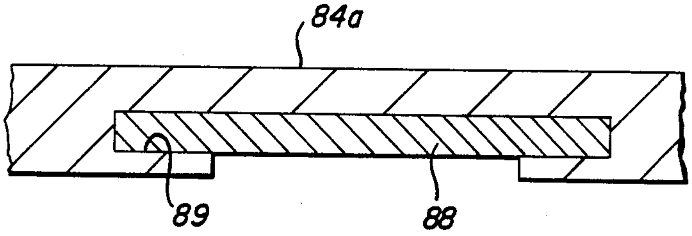
FIGS. 6*a* and 6*b* are enlarged cross-sectional views of a portion of the FIG. 4 cassette bottom wall showing one preferred construction in accord with the invention.
Figure 6B:
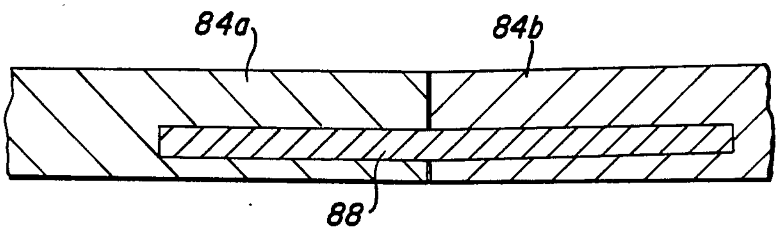

Thus, cassette 8 comprises a top wall 81, side walls 82 and 83, end wall 85 and a bottom wall including fixed wall segment 84*a* (coupled to the side and end walls) and movable wall segment 84*b*. The top wall 81 is relieved in its front portion 81*a* to provide access, to the lead ends of top sheets of a supported stack, for feed rollers 9, As indicated by dotted lines in FIG. 4 and shown more clearly in FIGS. 6*a* and 6*b*, the bottom wall segment 84*b* is coupled to bottom wall segment 84*a* by cantilever springs 88 that are force-fit into cut-out notches 89 formed in the lower surfaces of those segments. Springs 88 are constructed with a non-linear configuration that causes segment 84*b* to be urged by the resilient restoring force thereof, toward the top wall 81 of the cassette. Thus the two cantilever springs 88 act to both hingedly connect the segment 84*b* and spring-bias it upwardly. The unique construction consituted by bottom wall segment 84*b* and springs 88 therefore performs the functions of both the cassette bottom and the sheet force plate 31 (i.e., the member that urges inserted sheet stacks into contact with the feed roller 9 of the printer system). This cassette construction maximizes the sheet storage capacity for any given cassette height. Stated another way, this feature minimizes the overall height of the cassette and therefore the printer/cassette system for any selected nominal sheet storage capacity.

As shown in FIG. 4, the side walls 82 and 83 of the cassette each have mounted thereon sheet separator members 90 which comprise a pivot connector 91, pin guide and follower element 92, 93 and a right angle abutment portion 17 for buckling top sheets moved thereagainst. Because of pivot connection 91, the abutment portions can float with the top of a supported stack to be in proper buckler relation when the sheet stack is depressed by engagement with the sheet feed roller. The abutment portions 17 are located to engage the lead edge of top sheets in a supported stack so that, when driven by the feed roller, the top sheet is separated from the other stack sheets and moved into the path of guide members 16.

Figure 8A:
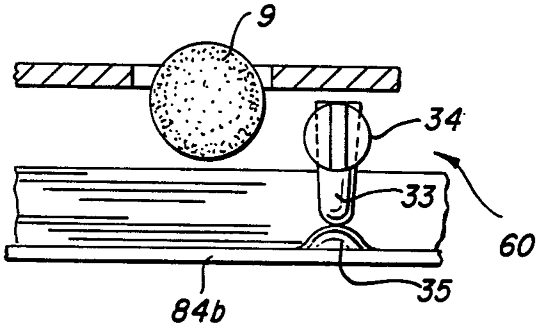
FIGS. 8*a* and 8*b* are enlarged side views also showing the FIG. 4 cassettes embodiment in conditions corresponding to FIGS. 7*a* and 7*b*, respectively.
Figure 8B:
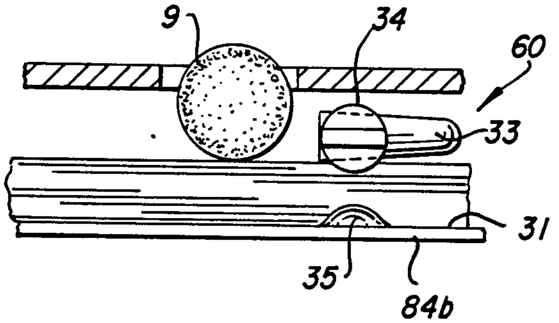

In accord with another feature of the present invention, FIGS. *7a*, *7b* and FIGS. *8a*, *8b* show one preferred cassette construction for facilitating sheet loading. Thus, post/ramp assemblies, denoted generally 60, are provided on each side of the cassette. As one component, these assemblies include raised ramp portions 35 formed on the top sides of bottom wall 84*b*, at a locations spaced forwardly from the pivot juncture with wall 84*a*. Rotatably mounted in the side walls of the cassette, at locations above the ramp portions 35, are cam components of the assemblies, each comprising a knob 34 on the outer side of the walls and a coupled post member 33 on the inner side of the wall. As best shown shown in FIGS. 8*a* and 8*b*, the knob 34 can be rotated from an exterior side of the cassette 8, from the FIG. 8*b* position to the FIG. 8*a* position to facilitate sheet loading. During such rotatation, post 33 engages surfaces 35 and moves the wall portion **84*b* to an open condition. A sheet stack can then be easily inserted into the cassette. The knob 34** then is returned to the FIG. 8*b* position to allow leaf springs 88 to move wall **88*b* upwardly, enabling its force plate function for establishing drive force between the feed roller 9** and top sheets of the inserted stack.

Figure 7A:
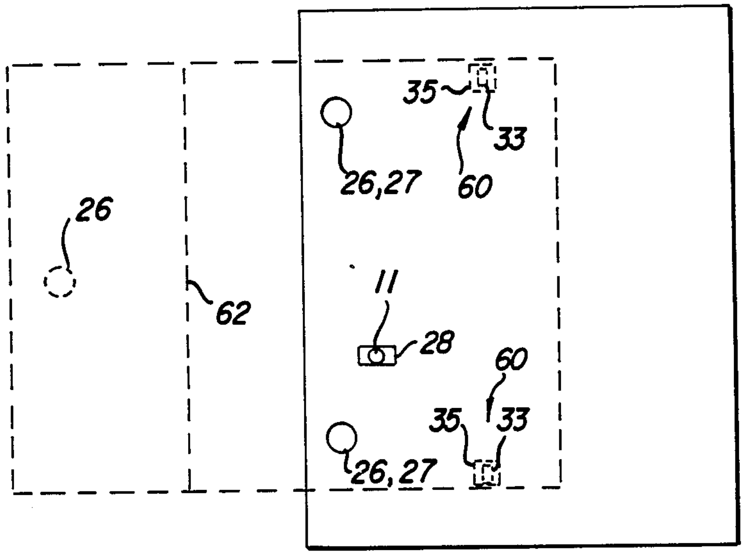
FIGS. 7*a* and 7*b* are top view diagrams of the FIG. 4 cassette showing it respectively, in the sheet load and print conditions.
Figure 7B:
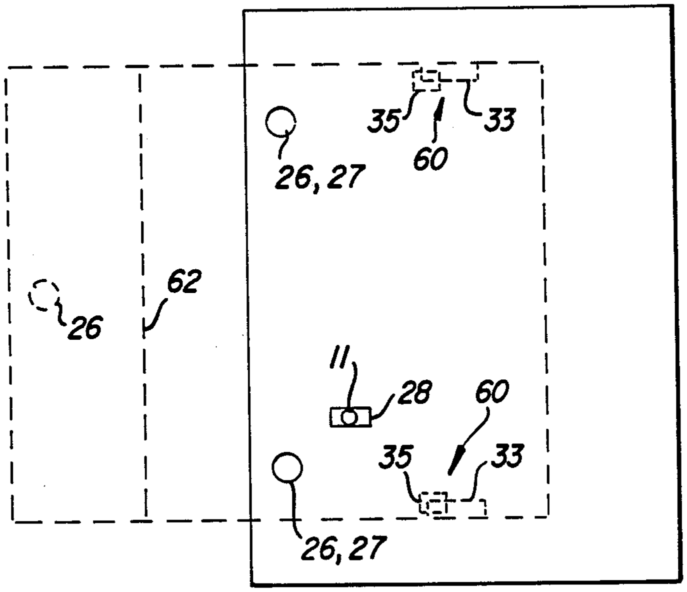

As is apparent from FIG. 4, the loading function is most easily done when the cassette is in the storage/-postage position. However in alternative embodiments, the rear portion of cassette top wall 81 can be constructed to open, e.g. pivot upwardly on the axis indicated by the dotted line 62 in FIGS. 7*a*, 7*b* to allow reloading with the cassette in the printing position.

The invention has been described in detail with particular reference to preferred embodiments thereof, but it will be understood that variations and modifications can be effected within the spirit and scope of the invention.

We claim:

1. In a compact printer of the kind having a housing, a top, bottom and side walls of generally sheet size perimeter, means for feeding a sheet from a sheet supply space to, and through, a print zone and means for printing on sheet media at said print zone, an improved sheet supply cassette comprising:

(a) top, bottom and side wall means forming a supply space having a generally sheet-size perimeteral outline and height sufficient to receive a stack of sheet media, said bottom wall means comprising a hinge-type construction wherein cantilever spring means couple and upwardly bias a movable front segment with respect to a fixed rear segment; and (b) means for rotatably coupling said cassette top wall to said bottom wall of said printer housing.

2. The invention defined in claim 1 wherein the front portion of said cassette top wall means is relieved to allow access for said printer feeding means to engage the top sheet of a contained sheet stack within said cassette.

3. The invention defined in claim 2 further comprising sheet buckler means formed on said cassette side wall means at a position for engaging the front end of top sheets in a contained stack.

4. The invention defined in claim 1 further including rotatable cam means, located on said cassette, for moving said front segment of said bottom wall, against the bias of said cantilever spring means, to open the front of said cassete for sheet loading.

5. For use with a compact printer of the kind having a housing of generally sheet size perimeter, means for effecting sheet feed from a sheet supply stack to, and through, a print zone, an improved sheet supply cassette comprising:

(a) top, bottom and side wall means foming a sheet stack space having a generally sheet-size perimeter, said bottom wall means including a fixed wall segment, a movable wall segment extending from said fixed wall segment and coupled to said cassette for hinge movement toward said top wall means and spring means for urging said movable wall segment toward said top wall means; and (b) means for coupling said cassette top wall to the bottom of such printer housing.

6. The invention defined in claim 5 wherein said spring means comprises cantilever spring means coupling said movable wall segment to said fixed wall segment.

7. A compact printer comprising a housing, means for feeding a sheet from a sheet supply region to, and through, a print zone, means for printing on sheet media at said print zone; and a sheet supply cassette coupled to the bottom of said printer housing, said cassette including top, bottom and side wall means forming said supply region, the bottom wall means of said cassette comprising a hinge-type construction wherein cantilever spring means couple and upwardly bias a movable front segment to a fixed rear segment of said bottom wall means, whereby sheets in said cassette are urged toward said feeding means.

* * * * *